US011392620B2

(12) United States Patent
Shtossel et al.

(10) Patent No.: US 11,392,620 B2
(45) Date of Patent: Jul. 19, 2022

(54) CLUSTERING LOG MESSAGES USING PROBABILISTIC DATA STRUCTURES

(71) Applicant: Hewlett Packard Enterprise Development LP, Houston, TX (US)

(72) Inventors: Amitai Shlomo Shtossel, Yehud (IL); Lioz Medina, Yehud (IL); Eli Revach, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 1351 days.

(21) Appl. No.: 15/182,119

(22) Filed: Jun. 14, 2016

(65) Prior Publication Data

US 2017/0357710 A1 Dec. 14, 2017

(51) Int. Cl.
*G06F 16/28* (2019.01)
*G06F 16/22* (2019.01)
*G06F 16/2455* (2019.01)
*G06F 16/35* (2019.01)

(52) U.S. Cl.
CPC ........ *G06F 16/285* (2019.01); *G06F 16/2255* (2019.01); *G06F 16/2455* (2019.01); *G06F 16/355* (2019.01)

(58) Field of Classification Search
CPC .......................... G06F 17/30598; G06F 16/285
See application file for complete search history.

(56) References Cited

U.S. PATENT DOCUMENTS

| 8,078,619 | B2 | 12/2011 | Bansal et al. |
| 8,209,567 | B2 * | 6/2012 | Cohen ................. G06F 11/3476 |
| | | | 714/26 |
| 8,930,369 | B2 | 1/2015 | Hotta et al. |
| 8,972,337 | B1 * | 3/2015 | Gupta ............... G06F 17/30563 |
| | | | 707/602 |
| 9,679,007 | B1 * | 6/2017 | Feldman ........... G06F 17/30371 |
| 9,906,477 | B2 * | 2/2018 | Chen ....................... H04L 67/42 |
| 10,430,424 | B2 | 10/2019 | Vizer et al. |
| 2009/0292679 | A1 * | 11/2009 | Ganesh .................... G06F 17/30 |
| 2011/0295813 | A1 | 12/2011 | Pickard et al. |
| 2012/0246303 | A1 | 9/2012 | Petersen et al. |
| 2013/0018884 | A1 * | 1/2013 | Chandrasekharappa .................... |
| | | | G06F 17/30985 |
| | | | 707/737 |

(Continued)

FOREIGN PATENT DOCUMENTS

WO WO-2015065379 5/2015
WO WO-2015065379 A1 5/2015

(Continued)

OTHER PUBLICATIONS

Bloom, B. H., "Space/time Trade-offs in Hash Coding with Allowable Errors," Communications of the ACM 13.7, 1970, pp. 422-426.
Joshi, B. et al., "Intelligent Clustering Scheme for Log Data Streams," International Conference on Intelligent Text Processing and Computational Linguistics, Springer Berlin Heidelberg, 2014, 12 pages.

(Continued)

*Primary Examiner* — Mohammad S Rostami

(57) ABSTRACT

A probabilistic data structure may be queried to test whether text of a received log message is present in the probabilistic data structure. The representative log messages may be included in respective existing clusters are included in the probabilistic data structure. Based on whether the text is present, whether to create a new cluster for the received log message may be determined.

17 Claims, 3 Drawing Sheets

(56) References Cited

U.S. PATENT DOCUMENTS

| | | | | |
|---|---|---|---|---|
| 2013/0018906 | A1* | 1/2013 | Nigam | G06F 17/30985 707/758 |
| 2014/0082211 | A1* | 3/2014 | Raichelgauz | H04L 65/608 709/231 |
| 2015/0032684 | A1* | 1/2015 | Gupta | G06F 17/30575 707/600 |
| 2015/0100682 | A1 | 4/2015 | Ueda | |
| 2015/0161213 | A1* | 6/2015 | Raichelgauz | G06F 17/3002 707/769 |
| 2015/0215152 | A1* | 7/2015 | Caldwell | H04L 67/16 709/202 |
| 2016/0034486 | A1* | 2/2016 | Dageville | G06F 17/30132 707/747 |
| 2016/0134503 | A1* | 5/2016 | Watson | H04L 43/026 709/224 |
| 2016/0154861 | A1* | 6/2016 | Hegerty | G06F 16/9535 707/728 |
| 2016/0253229 | A1 | 9/2016 | Sade et al. | |
| 2016/0337211 | A1* | 11/2016 | Singh | H04L 43/067 |
| 2017/0126603 | A1* | 5/2017 | Chen | H04L 51/14 |

FOREIGN PATENT DOCUMENTS

| | | |
|---|---|---|
| WO | WO-2015065388 | 5/2015 |
| WO | WO-2015065388 A1 | 5/2015 |
| WO | WO-2015108534 | 7/2015 |
| WO | WO-2015108534 A1 | 7/2015 |

OTHER PUBLICATIONS

Ledeneva, Y., "Effect of Preprocessing on Extractive Summarization with Maximal Frequent Sequences," Mexican International Conference on Artificial Intelligence, Springer Berlin Heidelberg, 2008, 11 pages.

Werner, M. et al., "The Gaussian Bloom Filter," International Conference on Database Systems for Advanced Applications, Springer International Publishing, 2015, 16 pages.

Bloom, Burton H., Space/Time Trade-Offs in Hash Coding with Allowable Errors, ACM Commun. 13(7), pp. 422-426 (1970), 5 pgs.

Joshi, Bista, and Ghimire, Intelligent Clustering Scheme for Log Data Streams, Computational Linguistics and Intelligent Text Processing: 15th International Conference, CICLing 2014 Kathmand Nepal Apr. 6, 12, 2014 Proceedings Part 2 (pp. 454-465) 12pgs.

Werner and Schonfeld, The Gaussian Bloom Filter, Database Systems for Advanced Applications: 20th International Conference, DASFAA 2015, Hanoi, Vietnam, Apr. 20-23, 2015 Proceedings part pp. 191-207 16 pgs.

Yulia, Gelbukh, and Hernandez, Effect of Preprocessing on Extractive Summarization with Maximal Frequent Sequences, MICAI 2008: Advances in Artificial Intelligence vol. 5317 of the series Lecture Notes in Computer Science pp. 123-132.

"Computational Linguistics and Intelligent Text Processing": 15th International Conference. Cicling 2014, Kathmandu, Nepal, Apr. 6-12, 2014; Part I, 11 pp.

* cited by examiner

CLUSTERING LOG MESSAGES USING PROBABILISTIC DATA STRUCTURES

BACKGROUND

In some examples, computer systems composed of many application (hardware and/or software) components, such as web services, enterprise applications, storage systems, etc., may collect, from their components, log messages.

BRIEF DESCRIPTION

Some examples are described with respect to the following figures.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

A "log message" is a textual messages. In some examples, log messages may include human-readable text. In some examples, log messages may errors or other events occurring in a computing system. Log messages may, for example, be stored in log files. A "cluster" is a group of log messages. A "probabilistic data structure" is a data structure that, when queried to test whether an element is in a set, outputs a result indicating that the element is definitely not in the set (i.e. a definite negative) or outputs a result indicating the element is possibly in the set (i.e. a possible positive). Therefore, the data structure does not return false negatives, but does return false positives. An example of a probabilistic data structure is a Bloom filter.

In some examples, log messages, which may be stored on networked servers, may be used in system development for debugging and understanding the behavior of a system. These log messages may store a large amount of information describing the behavior of systems. For example, systems may generate thousands or millions of log messages per second. In some examples, the log messages may be classified into clusters based on similarity. That is, each cluster may include log messages in which have a threshold level of similarity to each other. When a new log message is collected, the log message may be added to an existing cluster, or a new cluster may be created for the newly collected log message. This may involve comparing the new log message to a respective representative log message for each existing cluster. These comparisons may result in processing overhead significantly increasing as the clusters grow in number. For example, once there are thousands or millions of clusters, thousands or millions of comparisons may be performed each time a new log message is collected.

Accordingly, the present disclosure provides examples in which a probabilistic data structure (e.g. Bloom filter), which can determine whether an element is definitely not in a set, may be used to determine that the new log message is definitely not similar to any representative log messages in existing clusters. Therefore, a new cluster may be created for the new log message. This method may reduce processing overhead, because in some examples a single operation on the Bloom filter may be used to determine that a new cluster should be created, rather than comparing each representative log message for each of the existing clusters, which may in some examples number in the thousands or millions. Therefore, functionality of computer systems storing log messages may be enhanced.

Figure 1:
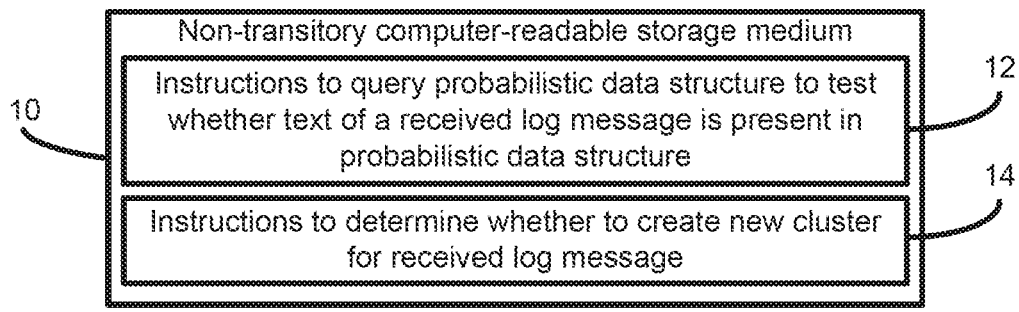
FIG. 1 is a block diagram illustrating a non-transitory computer readable storage medium according to some examples.

FIG. 1 is a block diagram illustrating a non-transitory computer readable storage medium 10 according to some examples. The non-transitory computer readable storage medium 10 may include instructions 12 executable by a processor to query a probabilistic data structure to test whether text of a received log message is present in the probabilistic data structure, wherein representative log messages included in respective existing clusters are included in the probabilistic data structure. The non-transitory computer readable storage medium 10 may include instructions 14 executable by a processor to, based on whether the text is present, determine whether to create a new cluster for the received log message.

Figure 2:
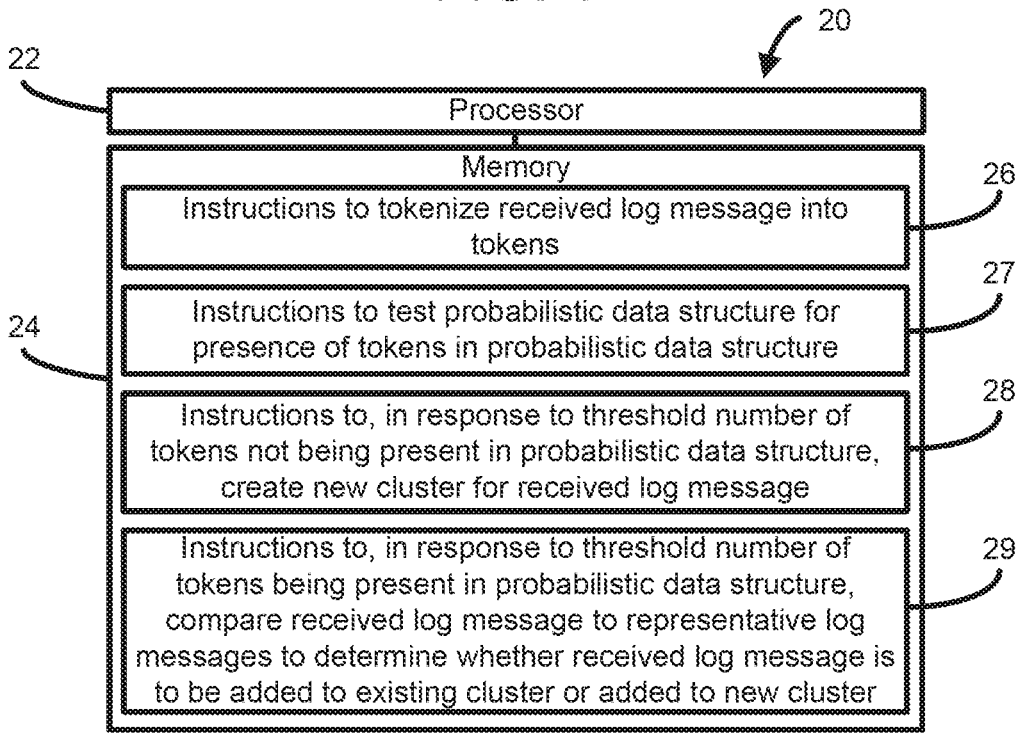
FIGS. 2 and 4 are block diagrams illustrating systems according to some examples.

FIG. 2 is a block diagram illustrating a system 20 according to some examples. The system 20 may include a processor 22 and a memory 24. The memory 24 may include instructions 26 executable by the processor to tokenize a received log message into a plurality of tokens. The memory 24 may include instructions 27 executable by the processor to test a probabilistic data structure for presence of the plurality of tokens in the probabilistic data structure, wherein the probabilistic data structure is modified to include representative log messages included in respective existing clusters. The memory 24 may include instructions 28 executable by the processor to, in response to a threshold number of the plurality of tokens not being present in the probabilistic data structure, create a new cluster for the received log message. The memory 24 may include instructions 29 executable by the processor to, in response to the threshold number of the plurality of tokens being present in the probabilistic data structure, compare the received log message to the representative log messages of the existing clusters to determine whether the received log message is to be added to the one of the existing clusters or added to the new cluster.

Figure 3:
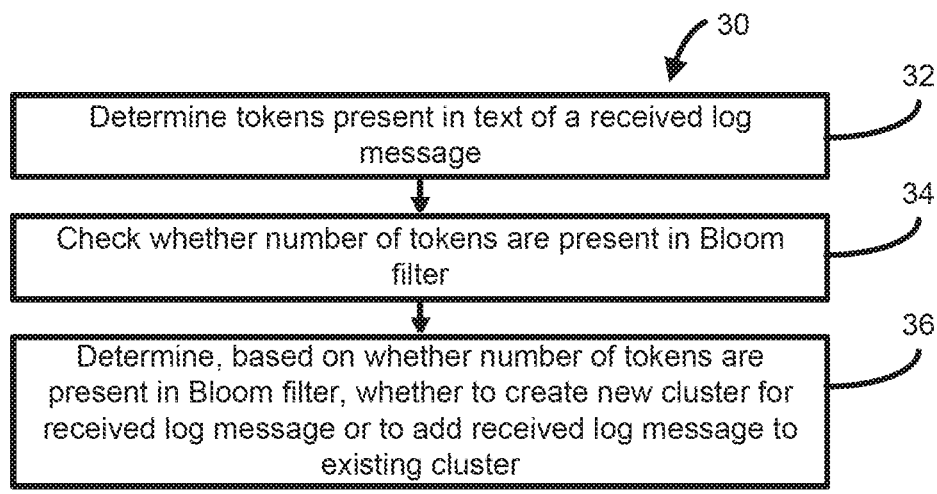
FIGS. 3 and 5 are flow diagrams illustrating methods according to some examples.

FIG. 3 is a flow diagram illustrating a method 30 according to some examples. The following may be performed by a processor. At 32, tokens present in text of a received log message may be determined. At 34, whether a number of the tokens are present in a Bloom filter may be checked, wherein representative log messages included in respective existing clusters are included in the Bloom filter. At 36, based on whether the number of the tokens are present in the Bloom filter, whether to create a new cluster for the received log message or to add the received log message to one of the existing clusters may be determined.

Figure 4:
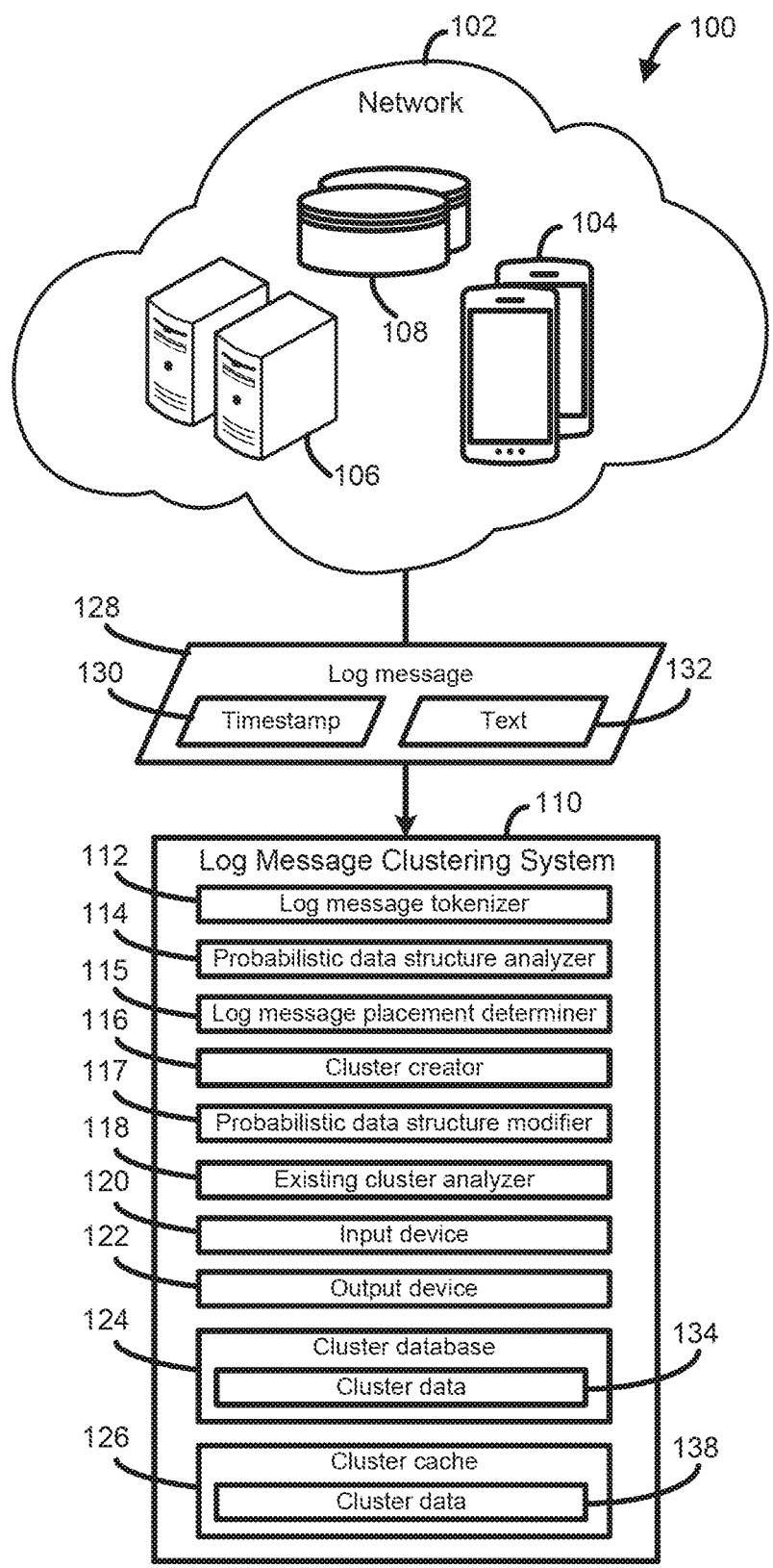

FIG. 4 is a block diagram illustrating a system 100 according to some examples. The system 100 includes a network 102 that may include an application layer that includes applications 104 (e.g. mobile applications, web applications, on-premise applications, cloud based applications, etc., which may be used by end users), e.g. running on user computing devices or other computing devices such as servers. The network 102 may include a computing layer including computing devices 106 such as servers, and a database layer including databases 108. Each of the databases 108 may be accessible to each of the applications 104, for example through the computing devices 106. Other devices may also be present in the network 102, such as printing devices, etc. The network 102 may, for example, be a local area network (LAN), wide area network (WAN), the internet, or any other network. In some examples, the network 102 may comprise components of an information technology (IT) infrastructure of an organization, such as a data center.

The system 100 may include a log message clustering system 110. The log message clustering system 110 may include a log message tokenizer 112, probabilistic data structure analyzer 114, log message placement determiner 115, cluster creator 116, probabilistic data structure modifier 117, and existing cluster analyzer 118. The log message clustering system 110 may be part of an administrator computing device to be operated by a user such as an IT professional. The log message clustering system 110 may support direct user interaction. For example, the log message clustering system 110 may include user input device 122, such as a keyboard, touchpad, buttons, keypad, dials, mouse, track-ball, card reader, or other input devices. Additionally, the log message clustering system 110 may include output device 124 such as a liquid crystal display (LCD), video monitor, touch screen display, a light-emitting diode (LED), or other output devices. The output devices may be responsive to instructions to display a visualization including textual and/or graphical data including representations of log messages, clusters, and probabilistic data structures during any part of the processes described herein.

In some examples, components of the log message clustering system 110, including the log message tokenizer 112, probabilistic data structure analyzer 114, log message placement determiner 115, cluster creator 116, probabilistic data structure modifier 117, and existing cluster analyzer 118, may each be implemented as a computing system including a processor, a memory such as non-transitory computer readable medium coupled to the processor, and instructions such as software and/or firmware stored in the non-transitory computer-readable storage medium. The instructions may be executable by the processor to perform processes defined herein. In some examples, the components of the log message clustering system 110 mentioned above may include hardware features to perform processes described herein, such as a logical circuit, application specific integrated circuit, etc. In some examples, multiple components may be implemented using the same computing system features or hardware.

The log message clustering system may also include a cluster database 124 and a cluster cache 126. Each of the cluster database 124 and cluster cache 126 may be implemented as a memory such as non-transitory computer readable medium storing instructions comprising cluster data.

In some examples, the cluster database 124 may store cluster data 134 comprising each of the clusters (e.g. all clusters). In an example, the four clusters (with cluster IDs 1, 2, 3, and 4) in Table 1, each containing three log messages, may be included in the cluster data 134. Each log message may include timestamp 130 and text 132. The text may be a textual narrative. As shown, one log message in each cluster may serve as a representative log message for that cluster. In this example, for each cluster, the representative log message is the first log message (i.e. has the earliest timestamp 130) to be included in the cluster. Each of the log messages may include a variable segment (underlined in Table 1) which may include different values across different log messages. Although not shown, a large number of additional clusters and additional log messages within clusters may be included in the cluster data 134.

TABLE 1

Cluster data 134

| Cluster ID | Representative Log? | Timestamp 130 | Text 132 |
|---|---|---|---|
| Cluster 1 | Yes | 2016-06-02 14:35:16 | unexpected failure while trying to ping user session #<u>55555</u> the session authentication has failed |
| | No | 2016-06-02 14:35:39 | unexpected failure while trying to ping user session #<u>44444</u>the session authentication has failed |
| | No | 2016-06-02 14:35:41 | unexpected failure while trying to ping user session #<u>33333</u> the session authentication has failed |
| Cluster 2 | Yes | 2016-06-02 14:35:17 | failed to retrieve the meta data of project '<u>null0</u>' the session authentication has failed |
| | No | 2016-06-02 14:35:40 | failed to retrieve the meta data of project '<u>null1</u>' the session authentication has failed |
| | No | 2016-06-02 14:36:11 | Failed to retrieve the meta data of project '<u>null3</u>' the session authentication has failed |
| Cluster 3 | Yes | 2016-06-02 14:35:19 | failed to get licenses for project session the session authentication has failed |
| | No | 2016-06-02 14:35:41 | failed to get licenses for project session the session authentication has failed |
| | No | 2016-06-02 14:50:08 | failed to get licenses for project session the session authentication has failed |
| Cluster 4 | Yes | 2016-06-02 14:35:19 | error processing request from <u>192.111.22.33</u> data starts with 0 \<u>00000023</u>\0 conststr download |
| | No | 2016-06-02 14:50:09 | error processing request from <u>192.111.22.33</u> data starts with 0 \<u>00000014</u>\0 conststr download |
| | No | 2016-06-02 14:50:14 | error processing request from <u>192.111.22.33</u> data starts with 0 \<u>00000512</u>\0 conststr download |

In some examples, the cluster cache 126 may store cluster data 138 comprising clusters which have recently received log message additions. The clusters in the cluster data 138 may be a subset of the clusters in the cluster data 134.

In some examples, cluster data 138 may include a threshold number of most recently updated clusters, i.e., those clusters that most recently received a new log message. That is, for example, the 50 most recently updated clusters may be included in the cluster data 138. In these examples, the log message clustering system 110 may delete clusters when they are no longer among the threshold number of most recently updated clusters.

In some examples, cluster data 138 may include clusters that received a new log message within a previous predetermined threshold period of time (e.g. within the last 10 minutes). In these examples, the log message clustering system 110 may delete clusters when they have not received a new log message within a previous determined threshold period of time.

In the example involving the cluster data 134 of Table 1, and if the cluster cache 126 includes cluster data 138 comprising clusters that received a log message within the last 10 minutes where the current time is 2016-06-02 14:55:00, the cluster data 138 may include two of the four clusters, specifically those with cluster IDs 3 and 4 as shown in Table 2. This is because the clusters with cluster IDs 3 and 4 include log messages with time stamps within the last 10 minutes.

TABLE 2

Cluster data 138

| Cluster ID | Representative | Timestamp 130 | Text 132 |
|---|---|---|---|
| Cluster 3 | Yes | 2016-06-02 14:35:19 | failed to get licenses for project session the session authentication has failed |
| | No | 2016-06-02 14:35:41 | failed to get licenses for project session the session authentication has failed |
| | No | 2016-06-02 14:50:08 | failed to get licenses for project session the session authentication has failed |
| Cluste 4 | Yes | 2016-06-02 14:35:19 | error processing request from 192.111.22.33 data starts with 0 \00000023\0 conststr download |
| | No | 2016-06-02 14:50:09 | error processing request from 192.111.22.33 data starts with 0 \00000014\0 conststr download |
| | No | 2016-06-02 14:50:14 | error processing request from 192.111.22.33 data starts with 0 \00000512\0 conststr download |

In some examples, during initial operation of the log message clustering system 110, the probabilistic data structure modifier 107 may receive or generate a blank probabilistic data structure, and store the probabilistic data structure in memory of the log message clustering system 110. Each time a cluster is added to the cluster data 134, the probabilistic data structure modifier 107 may add text from the representative log message to the probabilistic data structure. The probabilistic data structure may be a Bloom filter or other probabilistic data structure. An example of a blank Bloom filter is shown in Table 3. A Bloom filter may include a bit vector comprising a plurality of bits, with each bit having a "false" value (e.g. a value of 0) or a "true" value (e.g. a value of 1). In the present example, for illustrative purposes, the blank Bloom filter is shown with 12 bits (bits 0 through 11), however the Bloom filter may include any number of bits, and in this example includes additional bits. In this example, the blank Bloom filter is modified to have a value of −1 when the value is "false", and a positive value corresponding to cluster ID when the value is "true". In this example, the Bloom filter is blank, hence has a "false" value of −1 for each of its bits.

TABLE 3

Blank Bloom filter

| Bit Value | −1 | −1 | −1 | −1 | −1 | −1 | −1 | −1 | −1 | −1 | −1 | −1 |
|---|---|---|---|---|---|---|---|---|---|---|---|---|
| Bit # | 0 | 1 | 2 | 3 | 4 | 5 | 6 | 7 | 8 | 9 | 10 | 11 |

An addition to the Bloom filter may be performed using the add(Element) function, where the Element variable may comprise text from a representative log message of a newly created clusters. When the add(Element) is performed, the text in the Element variable may be hashed by a hash function or multiple hash functions. Each respective output of each hash function may output a bit number of a bit whose bit value is to be modified to a "true" value represented by the cluster ID of the cluster containing the text used in the Element variable. However, if a particular bit value is already modified to a "true" value, then any subsequent attempt to modify the bit value may be rejected such that the original "true" value may be maintained. Any suitable hash function that can be used with a Bloom filter may be used. In some examples, to allow tuning of the performance of the Bloom filter, a user may input into the input device 120 a selection of which specific hash functions to use with the Bloom filter, and what number of hash functions to use with the Bloom filter. In the example described herein, two hash functions may be used.

In the example of cluster data 134 shown in Table 1, add(Element) functions may be performed each time one of the four clusters in cluster data 134 is created. Therefore, the add(Element) may be performed on the following four texts: "unexpected failure while trying to ping user session #55555 the session authentication has failed" from the representative log message of cluster ID 1; "failed to retrieve the meta data of project 'null0' the session authentication has failed" from the representative log message of cluster ID 2; "failed to get licenses for project session the session authentication has failed" of cluster ID 3; and "error processing request from 192.11.22.33 data starts with 0 \00000023\0 conststr download" of cluster ID 4. Each operation of the add(Element) may, in the case of two hash functions, output two bit numbers whose bit values are then modified to a "true" value represented by the cluster ID of the cluster containing the text used in the Element variable. As shown in Table 4: the add(Element) function applied to cluster ID 1 causes the bit values of bit numbers 3 and 8 to be modified to a "true" value of 1 representing cluster ID 1; then the add(Element) function applied to cluster ID 2 causes the bit values of bit numbers 6 and 10 to be modified to a "true" value of 2 representing cluster ID 2; then the add(Element) function applied to cluster ID 3 causes the bit values of bit numbers 4 and 9 to be modified to a "true" value of 3 representing cluster ID 3; then the add(Element) function applied to cluster ID 4 causes the bit values of bit number 1 to be modified to a "true" value of 4 representing cluster ID 4. However, because one of the hash functions used in the add(Element) function applied to cluster ID 4 outputs a bit number of 3, which is already modified to the "true" value of 1 representing cluster ID 1 the bit value of bit number 3 is not modified,

TABLE 4

Populated Bloom filter

| Bit Value | −1 | 4 | −1 | 1 | 3 | −1 | 2 | −1 | 1 | 3 | 2 | −1 |
|---|---|---|---|---|---|---|---|---|---|---|---|---|
| Bit # | 0 | 1 | 2 | 3 | 4 | 5 | 6 | 7 | 8 | 9 | 10 | 11 |

In an example, the log message clustering system 110 may receive log messages 128 from a component of the network 102. A first of the new log messages 128 may comprise the timestamp 130 "2016-06-02 14:55:00" and the text 132 "unexpected failure while trying to ping user session #22222 the session authentication has failed". A second of the new log messages 128 may comprise the timestamp 130 "2016-06-02 14:55:00" and the text 132 "error locating data ABC in location XYZ". The operation of the log message clustering system 110 will be described using each of these examples as if one of these log messages is the next received log message.

In some examples, the log message tokenizer 112 may tokenize the texts 132 of the log messages 128 into tokens. A token is a segment of the text 132. A segment may be a word. In the first log message 128, the tokens may include "unexpected", "failure", "while", "trying", "to", "ping", "user", "session", "#22222", "the", "session", "authentication", "has", and "faded". In the second log message 128, the tokens may include "error", "locating", "data", "ABC", "in", "location", and "XYZ".

The log message tokenizer 112 may use any suitable tokenization algorithm. For example, the log message tokenizer 112 may identify tokens may identify spaces in the text 132 and designate letters between each set of spaces as a token.

In some examples, the probabilistic data structure analyzer 114 may query the probabilistic data structure (e.g. Bloom filter) to test whether each of the tokens is present in any of the representative log messages in the clusters of cluster data 134. In the example of a Bloom filter, the contain(Element) function may be used to input a token into the Bloom filter, which may then use, in the example of two hash functions, the two hash functions to output two bit numbers of the bit vector of the Bloom filter. The outputted bit numbers may be the same numbers as would have been outputted if the text in the token was added to the Bloom filter using the add(Element) function.

If the two outputs of the contain(Element) function for a token are bit numbers each of which already have "true" values in the Bloom filter, then this means that the inputted token is possibly in the Bloom filter (i.e. a possible positive). However, if the two outputs of the contain(Element) function for a token are bit numbers, one or both of which already has a "false" value (e.g. −1) in the Bloom filter, then this means that the inputted token is definitely not in the Bloom filter (i.e. a definite negative).

In some examples, the log message placement determiner 115 may determine whether a threshold amount (e.g. a threshold number or threshold percentage) of the tokens of a new log message 128 are contained in the Bloom filter. In some examples, the threshold amount may be 60% of the tokens. However, any other suitable threshold may be used. The relevance of the similarity in the tokens may be based on an assumption that log messages product by a same template, although unknown in advance, may be identical in many of the words, with differences at various variable parameters.

The log message placement determiner 115 may, in response to greater than the threshold amount of the tokens of the new log message 128 being contained in the Bloom filter, determine that the new log message 128 may or may not belong to an existing cluster. As discussed earlier, in an example, a new log message 128 may contain the tokens "unexpected", "failure", "while", "trying", "to", "ping", "user", "session", "#22222", "the", "session". "authentication", "has", and "faded". In this example, each of the tokens except "#22222" may be found in the Bloom filter by the probabilistic data structure analyzer 114. This log message placement determiner 115 may determine that more than the 60% threshold amount of tokens are found in the populated Bloom filter of Table 4. As will be described, the existing cluster analyzer 118 may then check each existing cluster, by comparing the new log message 128 to a representative log message for that existing cluster, to determine whether the new log message 128 belongs in an existing cluster or if a new cluster should be created to include the new log message 128.

The log message placement determiner 115 may, in response to the threshold amount or less than a threshold amount of the tokens of the new log message 128 being contained in the Bloom filter, determine that the new log message 128 should not be added to any existing cluster, and instead a new cluster should be created to include the new log message 128. As discussed earlier, in an example, a new log message 128 may contain the tokens "error", "locating", "data", "ABC", "in", "location", and "XYZ". In this example, the log message placement determiner 115 may determine that less than the 60% threshold amount of tokens are found in the populated Bloom filter of Table 4. This may vastly reduce processing overhead used for the log message clustering system 110 classifying new log messages 208, because a single contain(Element) operation on the Bloom filter may be used to determine whether a new cluster should be created, rather than the existing cluster analyzer 118 checking each existing cluster by comparing the new log message 128 to a representative log message for that existing cluster. Although four clusters in shown in cluster data 124 of Table 1, in many examples the cluster data 124 may include thousands or millions of clusters, causing thousands or millions of comparisons.

In some examples, the cluster creator 116 may create a new cluster in response to the log message placement determiner 115 determining that a new cluster should be created to include the new log message 128. For example, the cluster creator 116 may, in response to the log message placement determiner 115 determining that less than 60% of the tokens "the tokens "error", "locating", "data", "ABC", "in", "location", and "XYZ" are found in the Bloom filter of Table 4, create a new cluster with cluster ID 5, where the new cluster includes the new log message 128 including the text 132 "error locating data ABC in location XYZ".

In some examples, the cluster creator 116 may designate the new log message 128 as a representative log message for the new cluster with cluster ID 5.

In some examples, the probabilistic data structure modifier 117 may, according to the methods described earlier, add the text 132 "error locating data ABC in location XYZ" to the Bloom filter of Table 4 using the add(Element) function. This addition may result in the Bloom filter of Table 5, where the add(Element) function applied to cluster ID 5 causes the bit values of bit numbers 0 and 2 to be modified to a "true" value of 5 representing cluster ID 5.

TABLE 5

Populated Bloom filter

| Bit Value | 5 | 4 | 5 | 1 | 3 | −1 | 2 | −1 | 1 | 3 | 2 | −1 |
|---|---|---|---|---|---|---|---|---|---|---|---|---|
| Bit # | 0 | 1 | 2 | 3 | 4 | 5 | 6 | 7 | 8 | 9 | 10 | 11 |

The log message clustering system 110 may then repeat the processes described above for another received new log message 128.

In some examples, as discussed above, the existing cluster analyzer 118 may, in response to the log message placement determiner 115 determining that the new log message 128 may or may not belong to an existing cluster, determine whether the new log message 128 belongs in an existing cluster or if a new cluster should be created to include the new log message 128. To perform this task, the existing cluster analyzer 118 may check each existing cluster by comparing the new log message 128 to a representative log message for that existing cluster. The existing cluster analyzer 118 may perform the comparison using a similarity function. As mentioned earlier, the relevance of the similarity in the tokens may be based on an assumption that log messages product by a same template, although unknown in advance, may be identical in many of the words, with differences at various variable parameters.

In some examples, the similarity function may be an order-sensitive cosine similarity function defining a distance between two log messages. Such a similarity function may take the form $\langle text_1, text_2 \rangle = tokens_{12}/\sqrt{token_1 \cdot token_2}$, where $tokens_{12}$ is the number of identical tokens comparing each token position of log message 1 (having $text_1$) and log message 2 (having $text_2$), and where $token_1$ and $token_2$ are the numbers of tokens in the respective log messages 1 and 2. A resulting cosine distance may be a number between 0 and 1. When the result is 1, the two log messages are identical, and when the result is 0, the two log messages are completely different. Values between 1 and 0 represent a measure or degree of similarity. In other examples, the similarity function may additionally account for token insertions and deletions. Various other similarity functions may be used as well. The existing cluster analyzer 118 may determine that log messages are a match if the degree of similarity is greater than a threshold degree of similarity.

Although four clusters in shown in cluster data 124 of Table 1, in many examples the cluster data 124 may include thousands or millions of clusters, causing thousands or millions of comparisons. Therefore, the existing cluster analyzer 118 may first determine a degree of similarity, according to a similarity function, between the new log message 128 and each of the representative log messages in the cluster data 138 in the cluster cache 126. As mentioned earlier, the cluster cache 126 may include a subset of the clusters in the cluster data 134 that received a new log message within a previous predetermined threshold period of time (e.g. within the last 10 minutes). The clusters in the cluster data 138 in the cluster cache 126 in Table 2 may be checked first because log messages associated with the same cluster may arrive at similar times, and therefore in some examples the new log message 128 may be more likely to belong in the clusters in the cluster data 138 in the cluster cache 126 than other clusters in the cluster data 134 in the cluster database 124.

Additionally, the clusters in the cluster data 138 in the cluster cache 126 in Table 2 may be checked in order of number of cluster IDs returned by the Bloom filter using the contain(Element) for the new log message 128 using the probabilistic data structure analyzer 114. In the example where the new log message 128 contains the text 132 "unexpected failure while trying to ping user session #55555 the session authentication has faded", the text 132 contains 14 tokens. If the Bloom filter uses two hash functions, then inputting the 14 tokens into the Bloom filter outputs 28 bit numbers in the Bloom filter's bit vector, each of which corresponds to a bit value having either a "false" value or a "true" value represented by a cluster ID. Therefore, between clusters with cluster IDs 3 and 4 in the cluster data 138 in the cluster cache 126 in Table 2, the cluster whose cluster ID was returned the greatest number of times by the Bloom filter returned may be compared to the new log message 128 first, and then subsequent clusters may be compared in order of number of returned cluster IDs.

In the example where the new log message 128 contains the text 132 "unexpected failure while trying to ping user session #55555 the session authentication has failed", the existing cluster analyzer 118 may determine that the degree of similarity between the new log message 128 and the representative log messages in clusters with cluster IDs 3 and 4 in Table 2 (in the cluster data 138 in the cluster cache 126) are below the threshold degree of similarity. Therefore, the existing cluster analyzer 118 may determine that the new log message 128 does not belong in the clusters with cluster IDs 3 and 4 in Table 2. However, if the existing cluster analyzer 118 does find a match between the new log message 128 and a representative log message of a cluster in the cluster data 138 in the cluster cache 126 of Table 2, then the existing cluster analyzer 118 may add the new log message 128 to that cluster.

If the existing cluster analyzer 118 determines that the new log message 128 does not belong in the clusters with cluster IDs 3 and 4 in Table 2, then the existing cluster analyzer 118 may then determine a degree of similarity, according to a similarity function, between the new log message 128 and each of the representative log messages in the cluster data 134 in the cluster database 124 that are not already contained in the cluster data 138 in the cluster cache 126. In the example described above relative to Tables 1 and 2, this means that the clusters with cluster IDs 1 and 2 may be checked, because cluster IDs 3 and 4 may be in the cluster data 134 in the cluster database 124.

Additionally, the clusters in the cluster data 134 in the cluster database 124 in Table 1 (excluding the clusters in the cluster data 138 in the cluster cache 126 in Table 2) may be checked in order of number of cluster IDs returned by the Bloom filter using the contain(Element) for the new log message 128 using the probabilistic data structure analyzer 114. This ordering may be done in a similar way as described earlier relative to the clusters in the cluster data 138 in the cluster cache 126.

In the example where the new log message 128 contains the text 132 "unexpected failure while trying to ping user session #55555 the session authentication has failed", the existing cluster analyzer 118 may check the cluster with cluster ID 1 before the cluster with cluster ID 2 because the Bloom filter returned greater number of cluster IDs valued at 1 than a number of cluster IDs valued at 2 using the contain(Element) for the new log message 128. The existing cluster analyzer 118 may determine that the degree of similarity between the new log message 128 and the representative log message in the cluster with cluster ID 1 in Table 1 (in the cluster data 138 in the cluster cache 126) is above the threshold degree of similarity. Therefore, the existing cluster analyzer 118 may determine that the new log message 128 does belongs in the cluster with cluster ID 1. The existing cluster analyzer 118 may then add the new log message 128 to the cluster with cluster ID 1.

The log message clustering system 110 may then repeat the processes described above for another received new log message 128.

Figure 5:
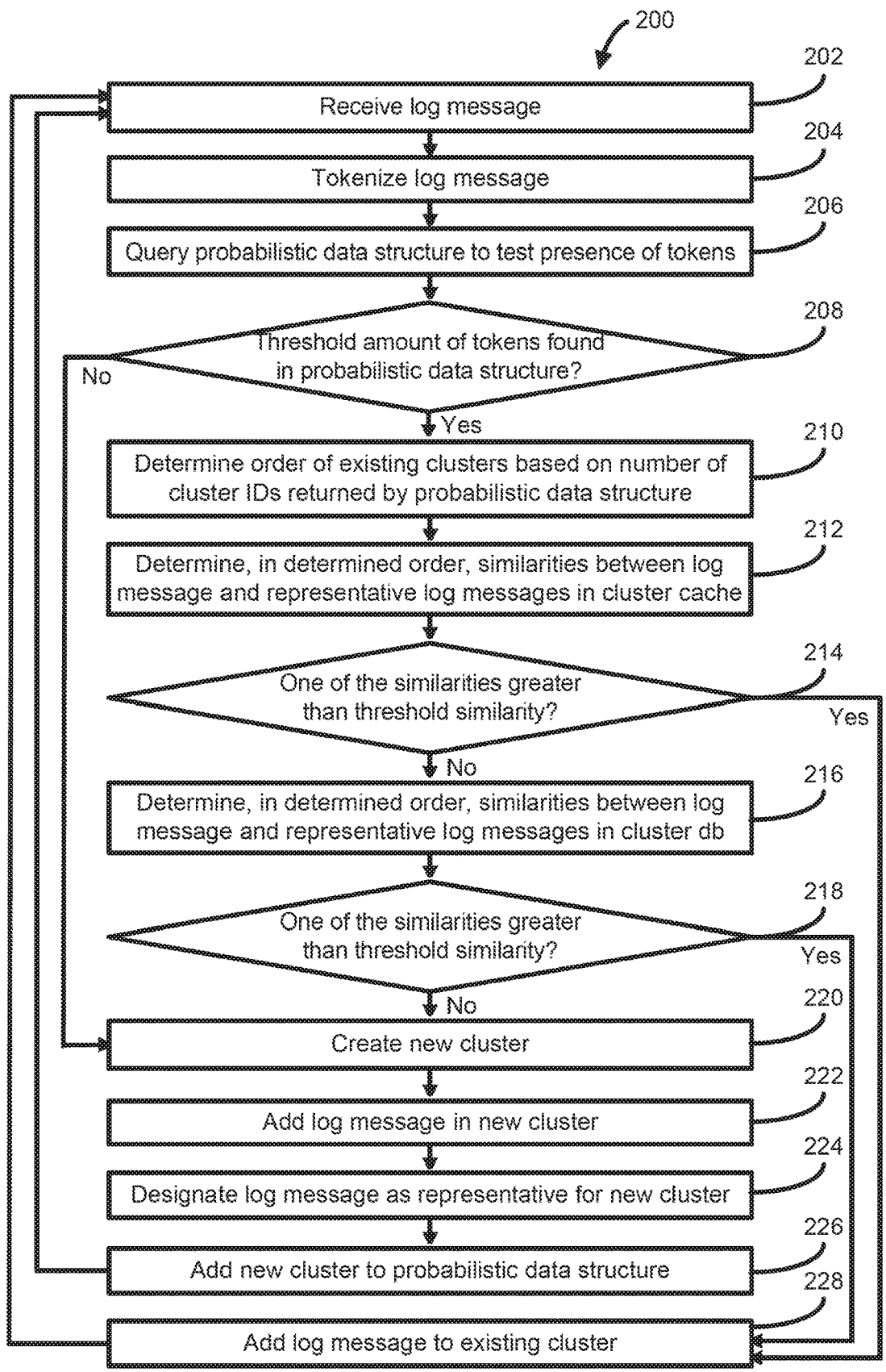

FIG. 5 is a flow diagram illustrating a method 200 according to some examples. In some examples, the orderings shown may be varied, some elements may occur simultaneously, some elements may be added, and some elements may be omitted. In describing FIG. 5, reference will be made to elements described in FIG. 4. In examples, any of the elements described earlier relative to FIG. 4 may be implemented in the process shown in and described relative to FIG. 5.

At 202, the log message clustering system 110 may receive log messages 128 from a component of the network 102. Any processes previously described as implemented in receiving the log messages 128 may be implemented at 202. The method 200 may proceed to 204.

At 204, the log message tokenizer 112 may tokenize the texts 132 of the log messages 128 into tokens. Any processes previously described as implemented by the log message tokenizer 112 may be implemented at 204. The method 200 may proceed to 206.

At 206, the probabilistic data structure analyzer 114 may query the probabilistic data structure (e.g. Bloom filter) to test whether each of the tokens is present in any of the representative log messages in the clusters of cluster data 134. Any processes previously described as implemented by the probabilistic data structure analyzer 114 may be implemented at 206. The method 200 may proceed to 208.

At 208, the log message placement determiner 115 may determine whether a threshold amount (e.g. a threshold number or threshold percentage) of the tokens of a new log message 128 are contained in the Bloom filter. Any processes previously described as implemented by the log message placement determiner 115 may be implemented at 208. If a threshold amount of tokens are found, the method 200 may proceed to 210, otherwise the method 200 may proceed to 220.

At 210, the existing cluster analyzer 118 may determine an order to check the clusters in the cluster data 134 in the cluster database 124 in Table 1 (and the cluster data 138 in the cluster cache 126 in Table 2), wherein the order is based on a number of cluster IDs returned by the Bloom filter using the contain(Element) for the new log message 128 using the probabilistic data structure analyzer 114. In some examples, the order may be subject to the constraint that degrees of similarity of a subset of the existing clusters in the cluster cache 126 are determined before degrees of similarity of a remainder of the existing clusters in the cluster database 124. Any processes previously described as implemented by the existing cluster analyzer 118 may be implemented at 210. The method 200 may proceed to 212.

At 212, the existing cluster analyzer 118 may determine a degree of similarity, according to a similarity function, between the new log message 128 and each of the representative log messages of the clusters (in the determined order) in the cluster data 138 in the cluster cache 126. Any processes previously described as implemented by the existing cluster analyzer 118 may be implemented at 212. The method 200 may proceed to 214.

At 214, if one the degrees of similarity is greater than a threshold degree of similarity, then the method 200 may proceed to 228, otherwise the method 200 may proceed to 216. Any processes previously described as implemented by the existing cluster analyzer 118 may be implemented at 214.

At 216, the existing cluster analyzer 118 may determine a degree of similarity, according to a similarity function, between the new log message 128 and each of the representative log messages of the clusters (in the determined order) in the cluster data 134 in the cluster database 124 (excluding the clusters in the cluster data 138 in the cluster cache 126). Any processes previously described as implemented by the existing cluster analyzer 118 may be implemented at 216. The method 200 may proceed to 218.

At 218, if one the degrees of similarity is greater than a threshold degree of similarity, then the method 200 may proceed to 228, otherwise the method 200 may proceed to 220. Any processes previously described as implemented by the existing cluster analyzer 118 may be implemented at 218.

At 220, the cluster creator 116 may create a new cluster to include the new log message 128. Any processes previously described as implemented by the cluster creator 116 may be implemented at 220. The method 200 may proceed to 222.

At 222, the cluster creator 116 may add the new log message 128 to the new cluster. Any processes previously described as implemented by the cluster creator 116 may be implemented at 222. The method 200 may proceed to 224.

At 224, the cluster creator 116 may designate the new log message 128 as a representative log message for the new cluster. Any processes previously described as implemented by the cluster creator 116 may be implemented at 224. The method 200 may proceed to 226.

At 226, the probabilistic data structure modifier 117 may add the text 132 of the new log message 128 to the probabilistic data structure (e.g. Bloom filter). Any processes previously described as implemented by the probabilistic data structure modifier 117 may be implemented at 226. The method 200 may proceed to 202 to repeat the method 200.

At 228, the existing cluster analyzer 118 may add the new log message 128 to the existing cluster whose representative log message has a degree of similarity to the new log message 128 that exceeds the threshold degree of similarity. Any processes previously described as implemented by the existing cluster analyzer 118 may be implemented at 228. The method 200 may proceed to 202 to repeat the method 200.

Any of the processors discussed herein may comprise a microprocessor, a microcontroller, a programmable gate array, an application specific integrated circuit (ASIC), a computer processor, or the like. Any of the processors may, for example, include multiple cores on a chip, multiple cores across multiple chips, multiple cores across multiple devices, or combinations thereof. In some examples, any of the processors may include at least one integrated circuit (IC), other control logic, other electronic circuits, or combinations thereof. Any of the non-transitory computer-readable storage media described herein may include a single medium or multiple media. The non-transitory computer readable storage medium may comprise any electronic, magnetic, optical, or other physical storage device. For example, the non-transitory computer-readable storage medium may include, for example, random access memory (RAM), static memory, read only memory, an electrically erasable programmable read-only memory (EEPROM), a hard drive, an optical drive, a storage drive, a CD, a DVD, or the like.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject matter disclosed herein. However, examples may be practiced without some or all of these details. Other examples may include modifications and variations from the details discussed above. It is intended that the appended claims cover such modifications and variations.

The invention claimed is:

1. A non-transitory computer-readable storage medium comprising instructions executable by a processor to:
   tokenize a received log message into a plurality of tokens;
   query a probabilistic data structure to test whether a number of tokens of the plurality of tokens contained in representative log messages exceeds a threshold number, wherein the representative log messages are included in respective existing clusters and a presence of text contained within the representative log messages is represented by the probabilistic data structure; and
   in response to the number of tokens exceeding the threshold number:
   determine a first degree of similarity between the received log message and a first representative log message of a first existing cluster of the existing clusters; and
   based on the first degree of similarity exceeding a threshold similarity, add the received log message to the first existing cluster.

2. The non-transitory computer-readable storage medium of claim 1, further comprising instructions executable by the processor to, based on the first degree of similarity not exceeding the threshold similarity, create a new cluster and designate the received log message as a representative log message for the new cluster.

3. The non-transitory computer-readable storage medium of claim 1, wherein the first degree of similarity is based on a first number of positions in the received log message and a corresponding second number of positions in the first representative log message including identical tokens.

4. The non-transitory computer-readable storage medium of claim 1, wherein the instructions, when executed by the processor, cause the processor to:
 determine a second degree of similarity between the received log message and a second representative log message of the representative log messages, the second representative log message of a second existing cluster of the existing clusters; and
 determine, in response to the first and the second degrees of similarity not exceeding the threshold similarity, that a new cluster is to be created for the received log message.

5. The non-transitory computer-readable storage medium of claim 4, wherein:
 the existing clusters are stored in a cluster database; and
 the instructions, when executed by the processor, cause the processor to store the existing clusters including the second existing cluster in a cluster cache in response to the second existing cluster having received a log message within a previous predetermined threshold period of time.

6. The non-transitory computer-readable storage medium of claim 5 wherein the instructions, when executed by the processor, cause the processor to determine an order to check the representative log messages of the existing clusters for similarity with the received log message, and wherein the first degree of similarity and the second degree of similarity are determined in the order subject to a constraint that degrees of similarity of the existing clusters are determined before degrees of similarity of a remainder of the existing clusters in the cluster database.

7. The non-transitory computer-readable storage medium of claim 1, wherein the instructions, when executed by the processor, cause the processor to:
 determine an order to check the representative log messages of the existing clusters for similarity with the received log message;
 determine a second degree of similarity between the received log message and a second representative log message of a second existing cluster of the existing clusters; and
 determine the first degree of similarity and the second degree of similarity in the order.

8. The non-transitory computer-readable storage medium of claim 7, wherein the order is based on a query of the probabilistic data structure.

9. The non-transitory computer-readable storage medium of claim 1, wherein the probabilistic data structure comprises a Bloom filter.

10. The non-transitory computer-readable storage medium of claim 9, wherein true bit values of the Bloom filter are represented by cluster IDs of the existing clusters.

11. The non-transitory computer-readable storage medium of claim 9, wherein to query comprises to hash the received log message using a plurality of hash functions of the Bloom filter to output bit numbers of a bit vector of the Bloom filter, and
 to determine comprises to determine, in response to at least one bit number of the output bit numbers corresponding to a false bit value, that a new cluster for the received log message is to be created.

12. The non-transitory computer-readable storage medium of claim 9, further comprising instructions executable by the processor to:
 create a new cluster for the received log message; and
 add the received log message to the Bloom filter by hashing the received log message using a hash function of the Bloom filter to change a bit value of the Bloom filter to a true bit value.

13. A system comprising:
 a processor; and
 a memory comprising instructions executable by the processor to:
 tokenize a received log message into a plurality of tokens;
 test a probabilistic data structure for presence of the plurality of tokens in the probabilistic data structure, wherein the probabilistic data structure is modified to include representative log messages included in respective existing clusters;
 in response to the test of the probabilistic data structure representing a threshold number of the plurality of tokens not being present in the probabilistic data structure, create a new cluster for the received log message; and
 in response to the test of the probabilistic data structure representing that the threshold number of the plurality of tokens is present in the probabilistic data structure, compare the received log message to the representative log messages of the existing clusters to determine whether the received log message is to be added to the one of the existing clusters or added to the new cluster.

14. The system of claim 13, wherein to compares comprises to:
 determine a first degree of similarity between the received log message and a first representative log message of the representative log messages, the first representative log message belonging to a first existing cluster of the existing clusters;
 determine a second degree of similarity between the received log message and a second representative log message of the representative log messages, the second representative log message belonging to a second existing cluster of the existing clusters;
 determine, in response to the first degree of similarity exceeding a threshold similarity, that the new cluster is not to be created and that the received log message is to be added to the first existing cluster; and
 determine, in response to the first and the second degrees of similarity not exceeding the threshold similarity, that the new cluster is to be created for the received log message.

15. The system of claim 13, further comprising instructions executable by the processor to:
 create the new cluster for the received log message;
 add the received log message to the new cluster;
 designate the received log message as a representative log message for the new cluster; and
 add the received log message to the probabilistic data structure by hashing the received log message using a hash function of the probabilistic data structure to change a bit value of the probabilistic data structure to a true bit value.

16. A method comprising:

tokenizing, by a processor, a received log message into a plurality of tokens;

querying, by the processor, a Bloom filter to test whether a number of tokens of the plurality of tokens contained in representative log messages exceeds a threshold number, wherein the representative log messages are included in respective existing clusters and a presence of text contained within the representative log messages is represented by the Bloom filter; and in response to the number of tokens exceeding the threshold number:

determining a first degree of similarity between the received log message and a first representative log message of a first existing cluster of the existing clusters; and based on the first degree of similarity exceeding a threshold similarity, adding the received log message to the first existing cluster.

17. The method of claim 16, wherein:

the Bloom filter comprises true bit values represented by cluster identifications (IDs) of the existing clusters;

the Bloom filter comprises a bit vector; and querying the Bloom filter comprises hashing the received log message using a plurality of hash functions of the Bloom filter to output bit numbers of the bit vector of the Bloom filter.

* * * * *